United States Patent [19]
Allen et al.

[11] Patent Number: 5,680,113
[45] Date of Patent: Oct. 21, 1997

[54] DYNAMIC ADDRESS ASSIGNMENTS TO SERIALLY CONNECTED DEVICES

[75] Inventors: James Johnson Allen, Raleigh; Robert D. Verne, Chapel Hill, both of N.C.

[73] Assignee: International Business Machines Corporation, Armonk, N.Y.

[21] Appl. No.: 393,976

[22] Filed: Feb. 24, 1995

[51] Int. Cl.$^6$ .................................................. H04Q 1/00
[52] U.S. Cl. ........................... 340/825.05; 340/825.52
[58] Field of Search ................... 340/825.05, 825.52, 340/825.53, 825.02; 395/183.08; 370/85.11, 401

[56] References Cited

U.S. PATENT DOCUMENTS

| | | | |
|---|---|---|---|
| 4,533,200 | 8/1985 | Wilson | 339/99 R |
| 4,626,846 | 12/1986 | Parker et al. | 340/825.52 |
| 4,658,375 | 4/1987 | Onogi et al. | 364/900 |
| 4,701,756 | 10/1987 | Burr | 340/825.02 |
| 4,779,092 | 10/1988 | Takao | 340/825.52 |
| 4,825,435 | 4/1989 | Amundsen et al. | 370/97 |
| 4,939,747 | 7/1990 | Adler | 375/3.1 |
| 5,027,342 | 6/1991 | Boulton et al. | 370/16 |
| 5,065,154 | 11/1991 | Kaiser et al. | 340/825.52 |
| 5,179,554 | 1/1993 | Lomicka et al. | 370/85.13 |
| 5,265,123 | 11/1993 | Vijeh et al. | 375/3 |
| 5,274,800 | 12/1993 | Babb et al. | 395/183.08 |
| 5,287,343 | 2/1994 | Nakamura et al. | 370/13.1 |

FOREIGN PATENT DOCUMENTS

| | | |
|---|---|---|
| 480-598-A1 | 4/1992 | European Pat. Off. . |
| 4022-000-A1 | 1/1992 | Germany . |

OTHER PUBLICATIONS

Preliminary Datasheet, Am79C981 Integrated Multiport Repeater Plus (IMR+), Advanced Micro Devices, Inc., Publication #17306, Rev. A, Amendment/0, Feb. 1993.

Preliminary Datasheet, Am79C987 Hardware Implemented Management Information Base, (HIMIB) Device, Advanced Micro Devices, Inc., Publication #17305, Rev. A, Amendment/0, Feb. 1993.

*Primary Examiner*—Edwin C. Holloway, III
*Attorney, Agent, or Firm*—Homer L. Knearl; Gerald R. Woods

[57] ABSTRACT

Dynamic address assignment and reconfiguration of serially connected addressable device components of a network system using interchangeable cables terminated by plugs. Successive pairs of the devices are coupled with identical cables having the same offset cross-connected wiring between the terminating plugs, but which establish a unique address for the device to which connected depending on the position of the device in a chain of connected devices without requiring changes to the devices per se, e.g., jumpers or switches. The bus structure requires only a single port per device and removal, failure, or replacement of a device does not affect nor impair the proper operation of the other devices.

6 Claims, 5 Drawing Sheets

| COLUMN | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| POWER ON | 1 | | | | | | | | | | | | | |
| STATE 0 | | 1 | | | | | | | | | | | | |
| STATE 1 | | | 1 | 1 | | | | | | | | | | |
| STATE 2 | | | | | 1 | | | | | | | | | |
| STATE 3 | | | | | | 1 | 1 | | | | | | | |
| STATE 4 | | | | | | | | 1 | 1 | 1 | | | | |
| STATE 5 | | | | | | | | | | | 1 | | | |
| STATE 6 | | | | | | | | 1 | | | | 1 | 1 | |
| MODULE ADDRESS | | 1 | | | | | | 1 | | | | | | |
| SEGMENT MESSAGE | | 1 | | | | | | 1 | | | | | | |
| COMMAND: SEGMENT = 1, JOIN = 0 | 0 | | 1 | | | | | | | | | | | |
| STATUS: SEGMENTED = 1, CONNECTED = 0 | | | 1 | 0 | | 0 | 1 | | 0 | 1 | | 0 | 1 | |
| ADRCHGINT | | | | | | | | | | | | | | 1 |
| SELECT STATE 0 | X | | | X | | X | X | | | X | | X | X | |
| SELECT STATE 1 | | X | | | | | | | | | | | | |
| SELECT STATE 2 | | | X | | | | | | | | | | | |
| SELECT STATE 3 | | | | | X | | | | | | | | | |
| SELECT STATE 4 | | | | | | | | X | | | | | | |
| SELECT STATE 5 | | | | | | | | | X | | | | | |
| SELECT STATE 6 | | | | | | | | | | | X | | | |
| SET RC = OK | | | | | | | X | | | X | | | X | |
| SET RC = ERROR | | | | | | | | | | | | X | | |
| READ INPUT PORT | | X | | | | X | | X | | | X | | | |
| OUTPUT CONNECT SIGNAL | | | X | | | | | | | | | | | |
| OUTPUT SEGMENT SIGNAL | | | | | | | | | X | | | | | |
| OUTPUT RESPONSE MESSAGE | | | | X | | X | | | | X | | X | X | X |
| READ MODULE ADDRESS | X | | | | | | | | | | | | | |

DYNAMIC ADDRESS ASSIGNMENTS TO SERIALLY CONNECTED DEVICES

DOCUMENTS INCORPORATED BY REFERENCE

U.S. Pat. No. 5,265,123, assigned to Advanced Micro Devices, Inc., is hereby incorporated by reference to illustrate the operation of commercially available multiple port repeaters and their associated hardware implemented management modules as used in the implementation of the invention described and claimed herein.

CROSS-REFERENCE TO RELATED APPLICATIONS

The present invention is used in the invention described in co-pending, commonly-assigned patent application Ser. No. 08/393,621, titled SEGMENTABLE ADDRESSABLE MODULAR COMMUNICATION NETWORK HUBS and filed concurrently herewith. The description of this cross-referenced application is incorporated herein by reference.

BACKGROUND OF THE INVENTION

1. Field of the Invention

This invention relates to data communication networks and particularly to networks having stackable repeaters.

2. Description of Prior Art

U.S. Pat. No. 5,065,154 describes a device interconnection scheme that uses series cross-wiring between devices and active devices for inverting the signals on some of the wires. If one device in the system is disconnected, fails, or installed, the entire system is adversely affected. The addresses are determined by the number of devices in the system and not by position within the system and they change when other devices are added or deleted from the system.

U.S. Pat. No. 5,179,554 relates to automatic tracking (association) of extended local area networks by station address augmentation. Ambiguities among network repeaters are precluded by assigning a unique port number which is reported when a query using a station request is recognized by the station assigned the address in the query.

U.S. Pat. No. 4,533,200 shows electrical connector stacking for piggy-backing plugs for flat cables. The wiring connections are not part of the description.

U.S. Pat. No. 4,658,375 depicts an expansion design for connection of a plurality of input/output devices to a controller. A plug for each device is supplied with a port at each end and connectors on the top which provide for attachment to the device. The port on one end is coupled to the controller or a previous device junction and the port at the other end is for connection to a following device junction. The ports at either end are directly wired pin to pin for tandem connection or cross-connected for parallel connection.

U.S. Pat. No. 4,939,747 relates to an addressable repeater which has an unalterable address built into it at manufacture to facilitate fault finding.

A German publication, Offenlegungsschrift DE 40 22 000 A1, shows a plug construction having two sockets or plugs on one side and one socket or plug on the other side for chaining connector cables. The wiring among the pins is strictly in parallel.

The systems shown in the above prior art references are useful for the purpose for which they were designed but do not address the problem of having to alter the addresses of devices or the system failures resulting from adding or changing or removing one or more devices in a system of interconnected devices.

Available stackable hubs or repeaters must be assigned addresses using switches or plugboard arrangements when installed in a system. They must also be connected to a control device that cannot be removed. Addition or removal or replacement of a hub or repeater entails disabling the system and adjusting addresses of the hubs. The invention described below eliminates the drawbacks of prior art stackable hubs so that hubs in the stack can be removed or disabled without adversely affecting the operation of the other hubs in the stack or having to adjust hub addresses.

SUMMARY OF THE INVENTION

In accordance with the invention, an address allocation apparatus for a group of interconnected devices where each device requires a unique address within the group has an interconnection cable for coupling pairs of devices. Each interconnection cable includes a pair of plugs, each having a plurality of pins for connection to a device and cross-coupling among the pins of a first plug is connected to the pins of a second plug so that pin n of the first plug is coupled to pin n+1 of the second plug. The last pin of the first plug is not connected, and the first pin of the first plug is connected to ground. Each device senses the signal on each pin connected to it and has a decoder for determining the address of the device from the signal values on the pins. The first plug of one interconnection means is connected piggyback to the second plug of another interconnection means.

BRIEF DESCRIPTION OF THE DRAWINGS

The invention is described in detail by referring to the various figures which illustrate specific embodiments of the invention, and wherein like numerals refer to like elements.

DETAILED DESCRIPTION

Figure 1:
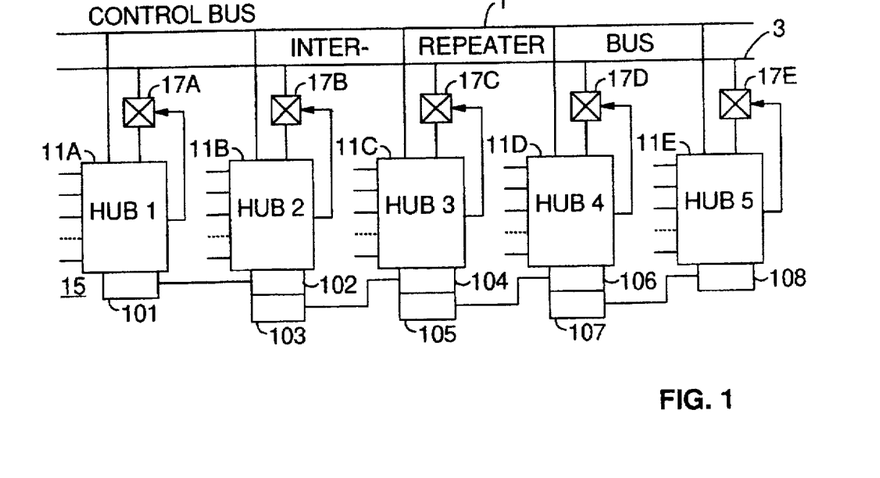
FIG. 1 is a block diagram of a group of repeaters or hubs utilizing the invention.

FIG. 1 illustrates a group of five hubs according to the invention. The hubs 11A–11E are coupled to a control bus 1 for receiving control signals from a central processor, and from one of the hubs which is designated as the master hub. The manner of such designation is explained in detail below. For purposes of the following descriptions and explanations, the terms used are defined in an Appendix following the Detailed Description.

The hubs 11A–11E are also coupled to an interrepeater bus 3 via controlled switches 17A–17E.

Each module (hub) typically controls 16 DTEs, coupled to ports 15, in a manner to be described below. Additionally, the modules are coupled to one another via interconnection cables and plugs 101–108. The manner of wiring and using the interconnection cables and plugs is described below in detail.

Coupling all modules together via the inter-repeater bus 3 permits the connected modules to function as a single repeater. This has a disadvantageous result of creating a single collision domain, i.e., increases the probability of collisions among two or more DTEs. Collisions occur when two or more signals interfere with one another. To allay the collisions from corrupting data being transferred, collision detection is provided to determine that a collision occurred and to mediate among the colliding sources by controlling transmissions.

A technique for reducing collisions is to segment, i.e., isolate, a module by disconnecting it from the inter-repeater bus. Segmenting is accomplished by controlling the modules' switches 17A–17E. This reduces the likelihood of a collision because the collision domain is restricted to the terminals or DTEs coupled to the isolated module. The terminals connected to the isolated module cannot communicate with the terminals connected to other modules while its module is disconnected from the inter-repeater bus, but they can communicate with other terminals connected to the same module. The latter situation is often acceptable because communication is often between terminals in a common area and therefore coupled to the same module. Also, a bridge or router can be added to allow access to other terminals on a different network.

For example, each module may be dedicated to a different department of an organization even though all the hubs in a stack may be located in a central location. The benefits of a LAN network include enhancements in performance and security by organizing the network into work groups and segmenting each module from the main repeater stack. This reduces the collision to only 16 ports instead of the 100 to 200 ports that may comprise the entire network.

Security is enhanced by segmenting the hub of a selected work group to isolate that group from other modules in the stack of hubs.

The decision to segment can be determined statistically when collisions increase beyond a predetermined threshold. The stackable hubs can be monitored from the central network management processor. Monitoring is performed by transmitting, upon request, the contents of statistical registers in the stackable hubs.

Examples of the statistics are registers that total performance parameters such as frames received on a port and faults such as CRC (cyclic redundancy check) errors. Segmentation can thereby be made in real time based on the analysis of the statistics.

A signal sent via the control bus 1 signifies that the module should be segmented or joined, i.e., isolated from the inter-repeater bus or connected to it.

Disconnecting a module in the prior art meant a loss of control of the terminals connected to the segmented module. The present invention avoids the problem and provides segmentation with full management of all modules in the stack without the need for branch or routers or some other way to communicate among segments as used in the prior art.

Stacking modules also results in a problem of module addressing. If a module is removed, extensive changing of cabling and addressing is required. These changes must be duplicated when a module is added to the stack, e.g., after removal for repairs and maintenance. This problem is solved in the present invention by the interconnection cables between modules.

Figure 2:
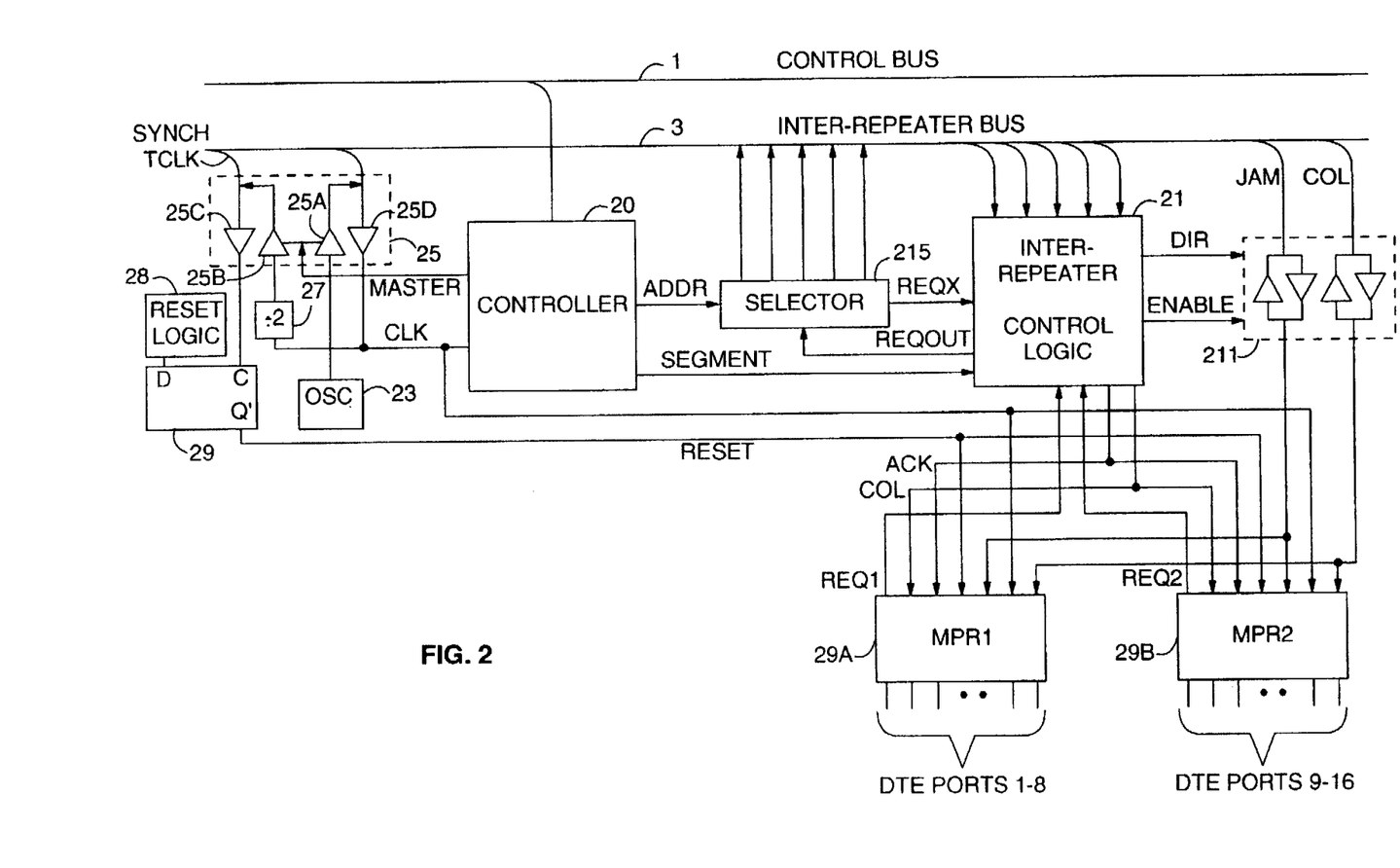
FIG. 2 is a block diagram of the logic components in a hub.

Each hub contains a controller 20 as shown in FIG. 2 and an inter-repeater control logic unit 21. The controller 20 is coupled to receive commands from the control bus 1 and provide an ADDR signal to selector 215. One of the lines on the inter-repeater bus 3 carries the CLK signal through buffer 25D to each hub. This CLK signal is used to synchronize operations of the hubs in the stack. If a hub is designated as the master hub, a signal MASTER is raised that couples the master hub's clock generator, OSC 23, to the CLK line of the inter-repeater bus 3 via a three-state transmitter 25A in the bus connector 25.

Another three-state transmitter 25B couples the clock signal divided by two through a divider 27 to the inter-repeater bus line SYNCH TCLK. This signal is used to reset a pair of MPRs 29A and 29B. These MPRs can be an HIM such as the Am79C987 and an MPR such as the Am79C981 described in the Appendix.

The SYNCH TCLK (a reset synchronizing signal) clocks a flip-flop 29 through buffer 25C to the set state if the output signal from a reset logic 28 is true. The reset logic 28 can be a power-on reset circuit (well known in the art) or a push button, or a combination of both. The MPR reset signal is thereby a local signal and not a bus signal. The inverted output signal RESET from the flip-flop 29 (Q') resets the MPRs 29A and 29B.

The inter-repeater control logic 21 receives a SEGMENT command signal from the controller 20 and five request signals REQX where X represents A, B, C, D, or E. Each MPR 29A and 29B sends a request signal to the inter-repeater control logic 21 as REQ1 and REQ2, respectively.

Two output signals, DIR and ENABLE, are applied by the inter-repeater control logic 21 to a three-state bus coupler 211 which control the direction and switching of the JAM and COL signals between the inter-repeater bus 3 and the MPRs 29A and 29B. The ENABLE signal performs the segment and join operations.

The inter-repeater control logic 21 also supplies the ACK and COL signals to the MPRs. The purpose of these signals is explained in the Appendix with respect to the commercial units. The inter-repeater control logic 21 also supplies a REQOUT signal to the selector 215.

The selector 215 is coupled to five module-request lines REQX and supplies five module present signals to the inter-repeater bus 3.

Figure 3:
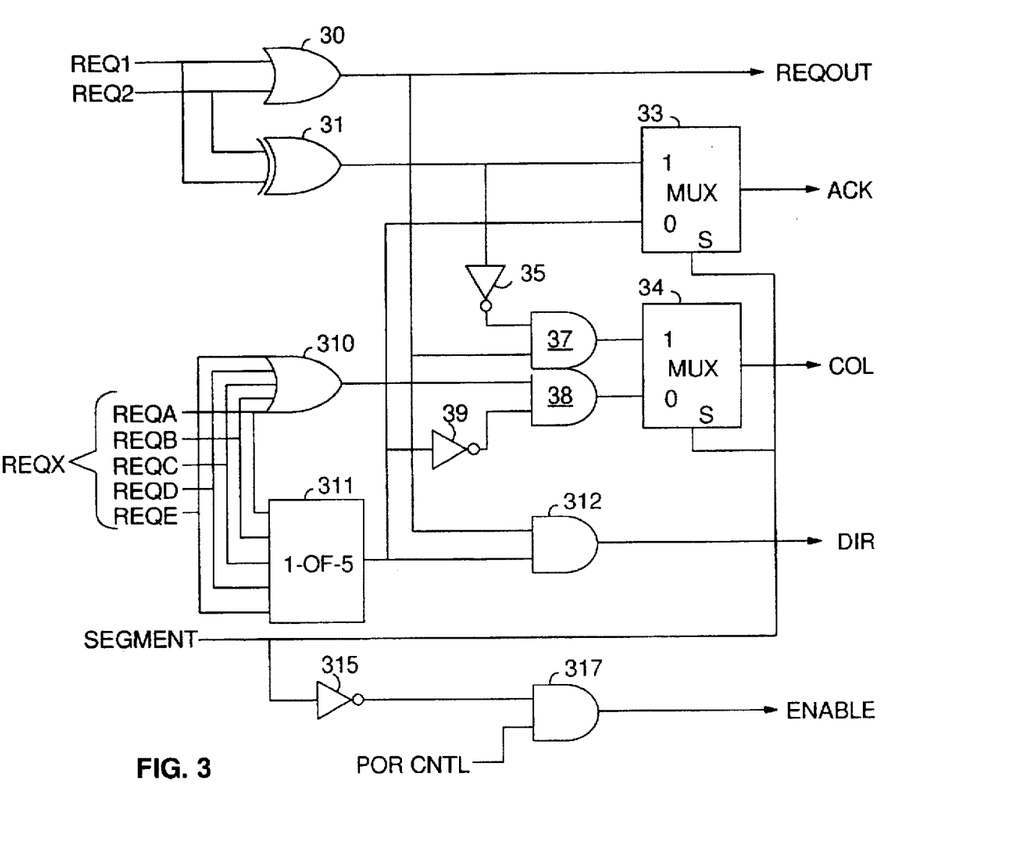
FIG. 3 is a diagram of the inter-repeater control logic.

The internal logic of the inter-repeater control logic 21 is shown in detail in FIG. 3. The input signals comprise the request signals from MRP1 29A and MRP2 29B labelled REQ1 and REQ2. These request signals are coupled to an OR gate 30 which supplies the REQOUT signal to the selector 215 which routes it to the correct request line in the inter-repeater bus 3. REQ1 and REQ2 are also applied to an exclusive-OR (XOR) gate 31 having its output signal coupled to a multiplexor 33. When the SEGMENT signal from the controller 20 is true, the output signal from the XOR gate 31 is selected as the multiplexor's output signal, ACK, the acknowledge output signal to the MPRs 29A and 29B. That is, when the hub is segmented, the inter-repeater control logic 21 responds only to requests from the MPRs 29A and 29B and supplies an ACK output signal only if there is a single request. If both request signals, REQ1 and REQ2, from the MPRs 29A and 29B are active simultaneously, the inter-repeater control logic 21 will supply the COL collision signal as explained below.

The REQX signals from the selector 215 are five request signals: REQA, REQB, REQC, REQD, and REQE. These signals are received from selector 215 from five lines of the inter-repeater bus 3. These five signals are applied to a five-input OR gate 310 and to a 1-of-5 detector 311. The output signal from the 1-of-5 detector 311 is ANDed in gate 312 with the output signal from the OR gate 30 to supply the DIR output signal. This signal controls the direction of the signal flow in the bus connector 211. The direction is determined by the states of the internal requests.

The COL collision output signal to the MPRs 29A and 29B is supplied from a multiplexor 34. When a request signal is produced by the OR gate 30 but the output signal from the XOR gate 31 is not present, indicating that both REQ1 and REQ2 are both present, a collision condition exists. This is detected by an AND gate 37 having an inverter 35 that complements the output signal from the XOR gate 31. Also, when there is an output signal from the OR gate 310 and none from the 1-of-5 detector 311, there is more than one of the REQX signals raised indicating a collision condition. This is detected by an AND gate 38 and an inverter 39 that complements the signal from the 1-of-5 detector 311. If the SEGMENT signal from the controller 20 is present, the first collision condition is gated through the multiplexor 34. Otherwise, the second collision condition is supplied as the output signal from the multiplexor 34. The COL signals from the inter-repeater control logic 21 and the bus connector 211 are effectively tied together in the MRPs 29A and 29B.

When the SEGMENT signal is not present, the output signal from the multiplexor 33 is produced by the output signal from the 1-of-5 detector 311 as the ACK signal.

The ENABLE output signal from the inter-repeater control logic 21 is supplied from an AND gate 317 and an inverter 315 when the SEGMENT signal is not present and the signal POR CNTL is true. The POR CNTL signal is true when the module is powered, i.e., active.

Figure 4:
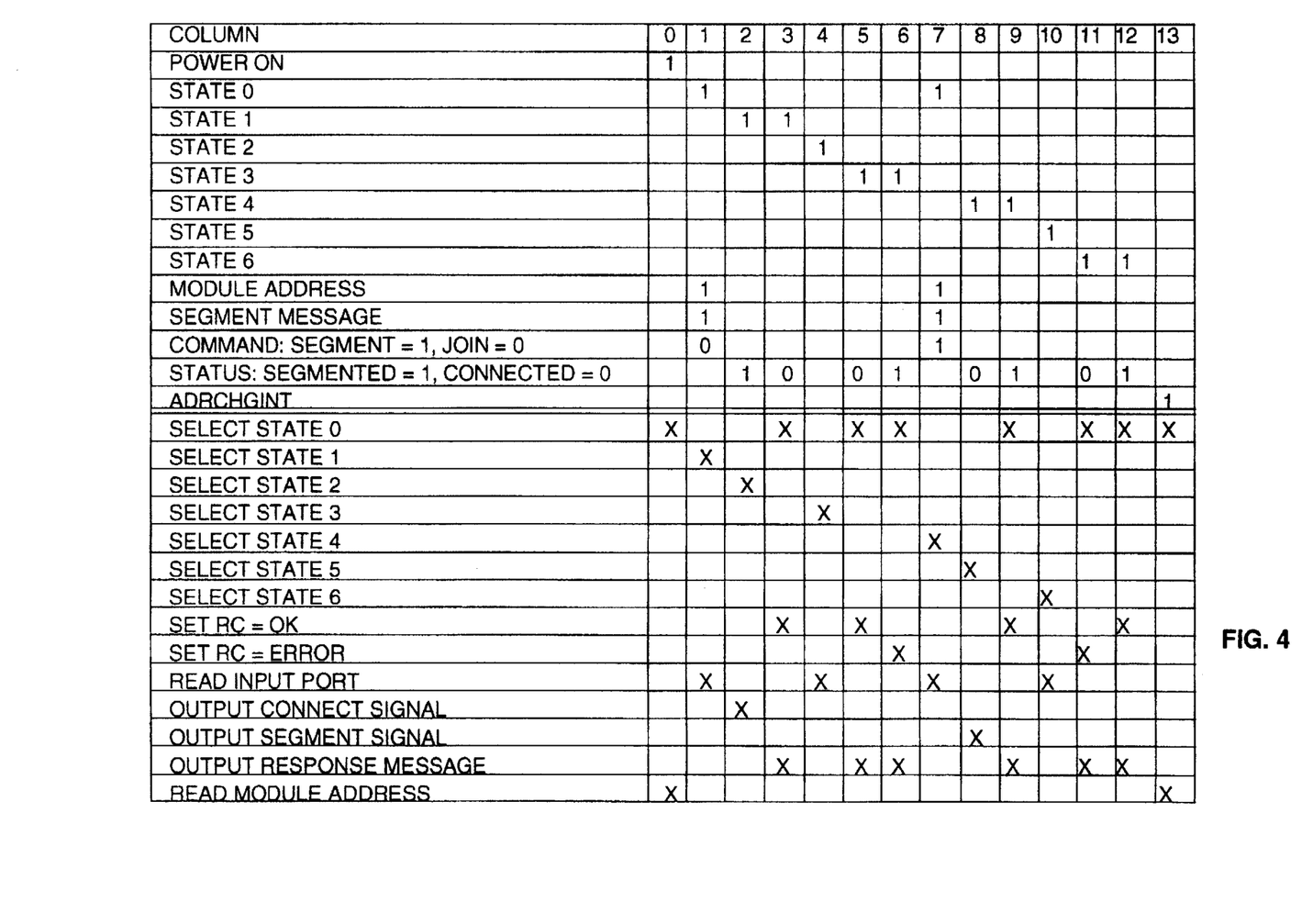
FIG. 4 is a state diagram of the operation of the controller.

The state table of FIG. 4 describes the logic of the controller 20. The master module sends a message via the serial port that identifies the sending (master) and receiving (addressed) modules. The addressed module decodes the segment command, i.e., SEGMENT or JOIN, attempts to execute the command, and returns a response message that indicates whether the command was successfully executed or not. (Which module in the stack is the master module is determined as explained below in more detail.)

The message format is in the form of a record with predetermined fields, shown below as a structure format as used in the C++ (or C) programming language.

```
The receive buffer structure is defined as struct recvbuff {
    char msgtype;   // module segment
    char da;        // receiving module identification
    char sa;        // sending module identification
    int tag;        // response-request correlation
    char rc;        // return code (OK or ERROR)
    char action;    // JOIN or SEGMENT
}
The response buffer is defined as struct respbuff {
    char msgtype;   // module segment
    char da;        // receiving module identification
    char sa;        // sending module identification
    int tag;        // response-request correlation
    char rc;        // return code (OK or ERROR)
    char action;    // JOIN or SEGMENT
}
```

The buffer structures are compared to insure that the correct controlled (receiving) module responded to the correct command.}

The controller 20 can be implemented as a hardware device or preferably it may be a microprocessor appropriately programmed by microcode to perform the described functions. In the latter case, the input and output functions to and from the controller 20 are coupled through input and output ports which are part of the microprocessor hardware.

A hardware or software implementation of the controller 20 can be constructed from the state table of FIG. 4 in the following manner. The portion of the table under the double line lists actions to be performed when the events or conditions in the upper part of the table are true (1) or false (0). (A blank space is a don't-care condition in that it doesn't occur at that point or, if it does, it has no effect.)

The signals that represent the conditions for each column are ANDed to supply the signals to execute the actions in the lower half of the table. The output signals from the AND gates represented by each column are Ored to supply the output signals in the action part of the table if an action occurs in more than one row.

When powered up, the controller 20 performs certain preliminary tasks called housekeeping. One of the housekeeping tasks is to determine the address assigned to the module (column 0). This is explained below in more detail. Another housekeeping task is to select state 0 (column 0), the idle or waiting state.

After housekeeping is completed, the controller 20 is initially set to state 0. When a message is received at its serial port (connected to the control bus 1), the message type (msgtype field) is checked to ascertain that it is a segment message. Additionally, the address (da) is checked to determine whether the particular controller (module) is being addressed.

If the two tests indicate that the message is intended for the particular module, state 1 is selected if the command is a join command (column 1 of FIG. 4) or as state 4 if the command is a segment command (column 7).

At the same time that state 1 or state 4 is selected, the status of the module to be controlled, i.e., connected or segmented, is read as the SEGMENT signal so that if the SEGMENT signal is high (true), it indicates the module is segmented and if low (false), it indicates that the module is joined.

In state 1, if the status of the port to be controlled is not connected (column 2), then a signal is sent to the inter-repeater control logic 21 to connect the module, i.e., the SEGMENT output signal to the inter-repeater control logic 21 is made false. State 1 in this case selects state 2. If the module to be controlled is determined to be already connected (column 3) in state 1, then the return code field (rc) of the receive message is set to a value indicating that the connection was successfully made (rc=OK), state 0 (the idle state) is selected, and the response message is composed and transmitted to the master (sending) module.

In state 2 (column 4), the status of the module to be controlled is read and state 3 is selected.

In state 3 (columns 5 and 6), the status of the module to be controlled is checked. If connected, then the return code (rc) of the receiving buffer is set to indicate the command was successfully completed (OK). If not connected, then the return code is set to indicate that the connection was not successfully made (ERROR). Then the response message is composed and transmitted to the master module and state 0 is selected.

If the command was to segment (disconnect the module, then state 4 was selected as described above. In state 4

(columns 8 and 9), the status of the module to be controlled is checked. If already segmented (column 9), the return code of the receive buffer is set to indicate that the command was successfully executed (OK), the response message composed and transmitted, and state 0 is selected If the module to be segmented is connected in state 4, a signal is sent to segment and state 5 is selected.

In state 5, the status of the module to be controlled is checked and state 6 is selected. If the status of the module to be controlled is still connected in state 6, the return code of the receive buffer is set to the error code, the response message is composed and transmitted, and state 0 is selected. Otherwise, if the module was successfully segmented, the return code of the receive buffer is set to indicate success, the response message is composed and transmitted, and state 0 is selected.

When the join or segment operation is completed, a response message is composed and transmitted. The response message is constructed in the response buffer using the respbuff structure from the contents of the module's receive buffer. The steps are

```
respbuff.da = recvbuff.sa     // desination is sender
respbuff.sa = recvbuff.da     // source is destination
respbuff.tag = recvbuff.tag   // request tage from sender
respbuff.msgtype = SEGMENT or JOIN
respbuff.rc = recvbuff.rc     // set return code
```

The message from the response buffer is sent from the module receiving the request to the module or host processor sending the request. This verifies that the segment or join request from the master module has been successful or that an error occurred after the attempt to execute the join or segment command.

In column 13 of FIG. 4, an address change interrupt signal (ADRCHGINT) causes the address of the module to be read again. The origin of the ADRCHGINT signal is explained below and occurs when a module is removed or added to the stack. Although the address of a particular module may not change, its status as the master module or not may be altered depending on the position of a module being added or removed from the stack.

Figure 5:
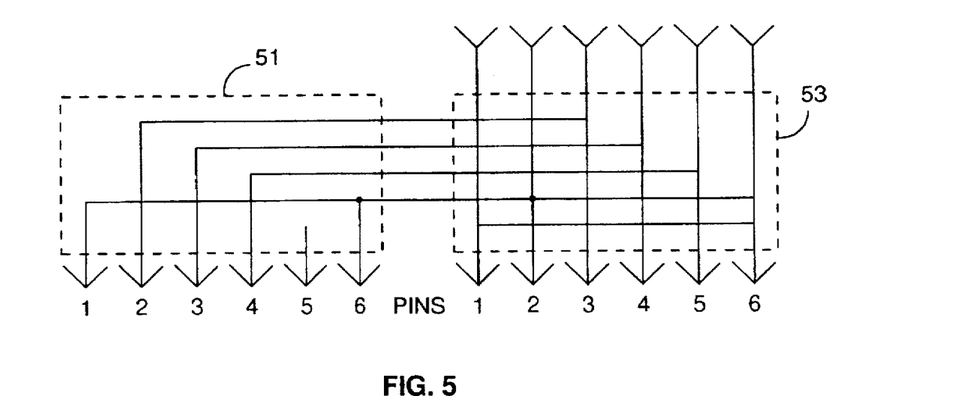
FIG. 5 is a wiring diagram of the hub interconnection cables.

Determination of a module's address and which module is to act as the master module is made by the plugs 101 to 108 of FIG. 1. Essentially, the inside plugs 102, 104, 106, and 108 and the outside plugs 101, 103, 105, and 107 have six pins dedicated to such determination. The plug wiring is shown in FIG. 5 where a plug 51 is an outside plug and a plug 53 is an inside plug. As illustrated, the outside plugs are piggy backed onto the inside plugs except for the first module (HUB 11A in FIG. 1).

Pin 6 of each plug is the common ground and pin 1 of each plug is coupled to pin 6. The outside plug 51 has its pin 1 coupled to pin 6 and to pin 2 of the inside plug 53. The pins 2, 3, and 4 of the outside plug 51 are coupled to the pins 3, 4, and 5, respectively of the inside plug 53. In the outside plug 51, the pin 5 is not connected. Pin 6 of both plugs 51 and 53 are coupled together.

In the hubs, socket pin 6 is connected to ground and the other pins are connected to pull-up resistors to produce a true signal on the ungrounded pins. The socket pins 1 through 5 are used to determine the address of the module.

The input pin 1 of the first outside plug 101 to HUB1 11A in FIG. 1 is coupled to ground (logic 0 or false). The other pins 2, 3, 4, and 5 are floating, i.e., not connected any source since it is the first in the series. The input signals are therefore true or logical 1 by virtue of the pull-up resistors. As a result, the pin signals are 0, 1, 1, 1, and 1 for pins 1, 2, 3, 4, and 5, respectively. The HUB1 11A would therefore be assigned an address value of 01111.

The second hub in series, viz., HUB2 11B in FIG. 1, has an address determined by the wiring of the inside plug 102 such as the plug 53 of FIG. 5. Since pin 1 is coupled to pin 6, it has a value of logical 0 (ground). Furthermore, since pin 1 of plug 101 (plug 51 of FIG. 5) is coupled to pin 2 of the plug 102, pin 2 is also at logical 0 (ground). The remaining pins of the plug 102 (plug 53 of FIG. 5) are floating and therefore are at logical 1 because of the pull-up resistors. Consequently, the resulting address for HUB2 11B is 00111.

Since the plugs 103 and 104 are interconnected the same way as shown in FIG. 5, pins 1, 2, and 3 of the plug 104 are connected to logical 0 (ground), pins 1 and 2 by virtue of being coupled to pin 1 of the plug 102 which was coupled to logical 0 as described above. Pin 3 of plug 104 is coupled to logical 0 (ground) because it is connected to pin 2 of the plug 103 which in turn is connected to pin 2 of the plug 102 which is at logical 0. Therefore, the address pins 1 through 5 of the plug 104 supply the address 00011 to the HUB3 11C.

In a similar manner, the address pins 1 through 5 supply the address 00001 to the HUB4 11D and 00000 to the HUB5 11E in FIG. 1. An address value of 11111 indicates that no cable is connected.

Thus, each pair of inside and outside plugs are coupled in the same way as shown in FIG. 5 and are interchangeable. If more than five hubs are to be used in a stack, then more pins can be added using the same connection scheme. If a module is removed from the stack, e.g., for maintenance purposes, and another put in its place, the replacement module or hub will have the same address without need for internal changes to the module. As will be shown below, a module or hub can removed without replacement and the remaining modules will operate properly.

Figure 6:
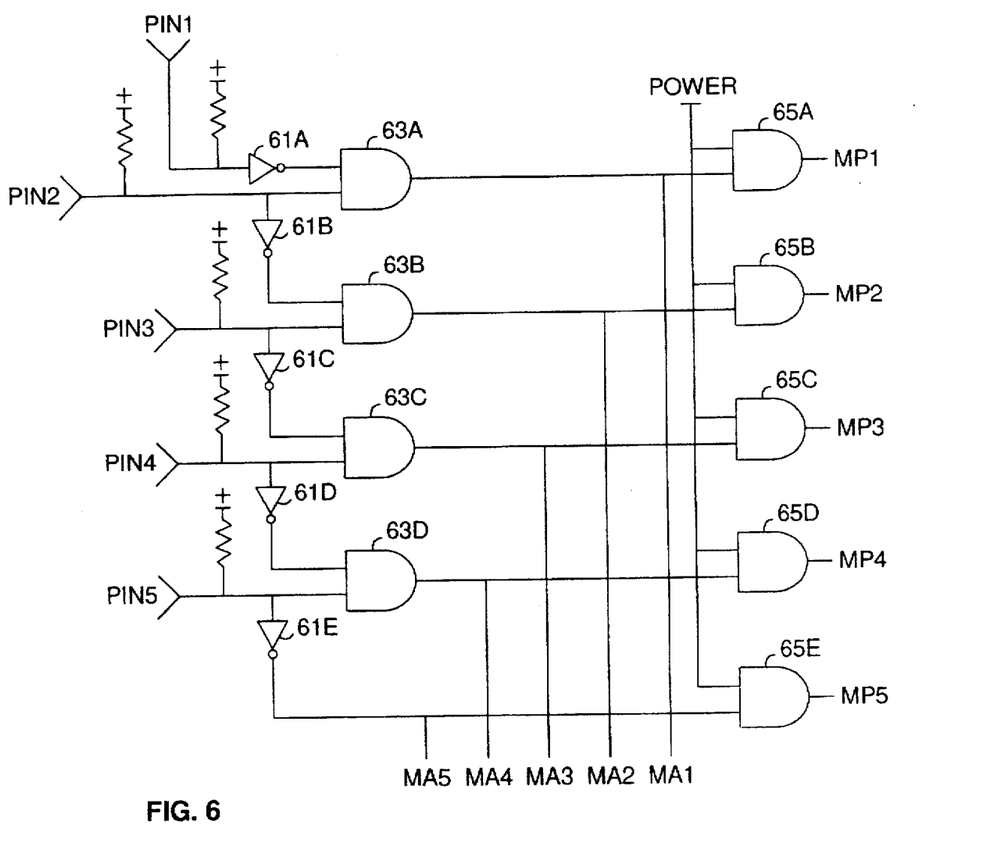
FIG. 6 is a logic diagram of the address decoder in the selector of FIG. 2.

FIG. 6 shows the decoding logic. The pins 1 to 5 are pulled up to a true value (logical 1) through resistors. If the input signals to the pins are grounded, then the pin signal is logical 0.

The pin 1 (connected to ground) is coupled through an inverter 61A to an AND gate 63A. The other input signal to the AND gate 63A is pin 2. If pin 2 is not connected to ground, the AND gate 63A will be activated, supplying an MA1 signal which denotes that the module is assigned the address of MA1, i.e., 01111.

If pin 2 is connected to ground, then the AND gate 63A is not activated and, via an inverter 61B, an AND gate 63B is primed. If pin 3 is logical 1, the AND gate 63B is enabled, supplying the address signal MA2 (00111).

The address signals MA3 and MA4 are generated in a similar manner by inverters 61C and 61D, respectively, through AND gates 63C and 63D, respectively, when pins 3 and 4 are connected to logical 0 (ground), respectively.

The address signal MA5 is supplied from an inverter 61E when pin 5 is connected to logical 0. Since the address pin input values are 01111, 00111, 00011, 00001, or 00000, only one of the AND gates 63A–63D or the inverter 61E will be activated at a time.

Also in FIG. 6 are five AND gates (or bus drivers) 65A to 65E supplying 'module present' signals MP1 to MP5, respectively. The AND gates are primed by the MA1 through MA5 address signals and enabled by a signal signifying the power is applied to the module, e.g., the POR CNTL signal. That is, when the module is operational, it supplies one of the MP signals indicating the module is present. The five module present signals (MP1 to MP5) are connected, each to one of five module present lines, on the inter-repeater bus 3.

Figure 7:
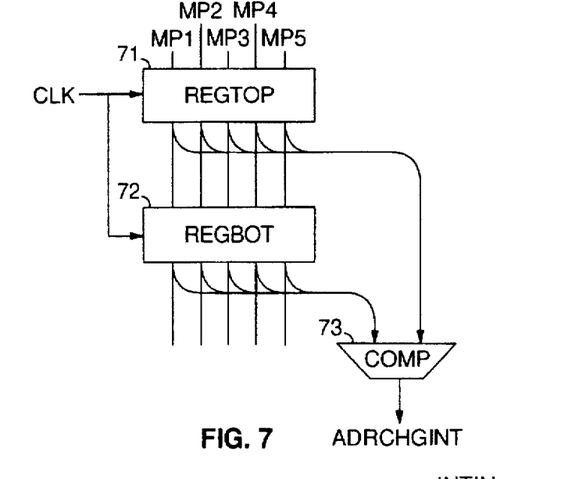
FIG. 7 is a logic diagram of the address interrupt circuit.

As shown in FIG. 4, the module's address is determined at initial power on time but after operations have been started, a hub in the stack may be removed. This will require possible resetting of logical variables. To signal a change in the hub stack, the module present signals from the inter-repeater bus 3 can be gated into a register 71 (REGTOP) as shown in FIG. 7 by each clock pulse. Each clock pulse can also gate the contents of the register 71 into a second register 72 (REGBOT). The output signals from the registers 71 and 72 are connected to a comparator 73. If there is a change of the signals on the module present bus lines, the contents of the registers 71 and 72 will be different and the comparator 73 will generate an interrupt signal ADRCHGINT which will cause the controller 20 to keep the module addresses up to date by detecting changes in the status of the hubs in the stack.

Figures 8, 9:
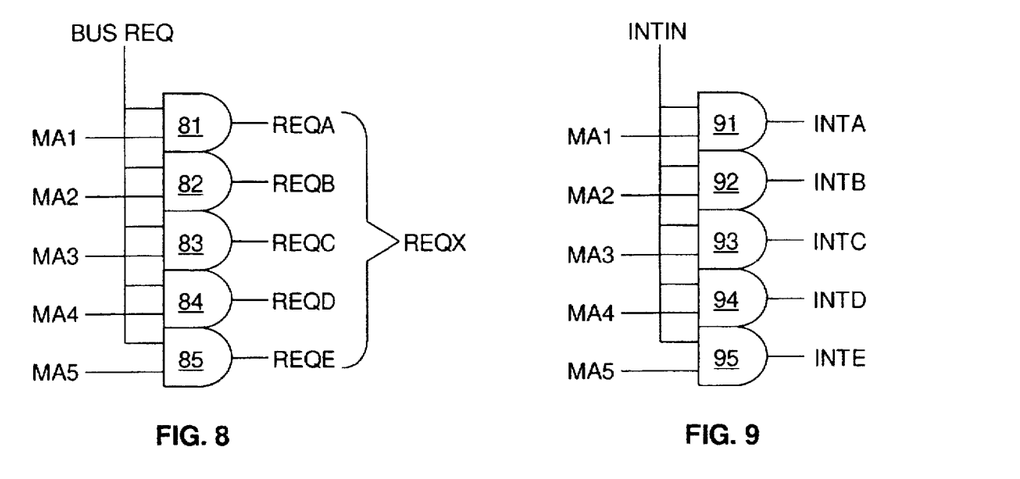
FIG. 8 is a logic diagram of the REQX circuit.
FIG. 9 is a logic diagram of the INT circuit.

As shown in FIG. 8, the MA address signals serve to gate the proper REQX signal via a set of AND gates 81 to 85 when a bus request signal (BUS REQ) signal is raised.

In FIG. 9, the interrupt output signals (INTX) for each module is internally supplied by a set of AND gates 91 to 95 according to the module address (MA address signals) when the interrupt input signal (INTIN) is present.

Figure 10:
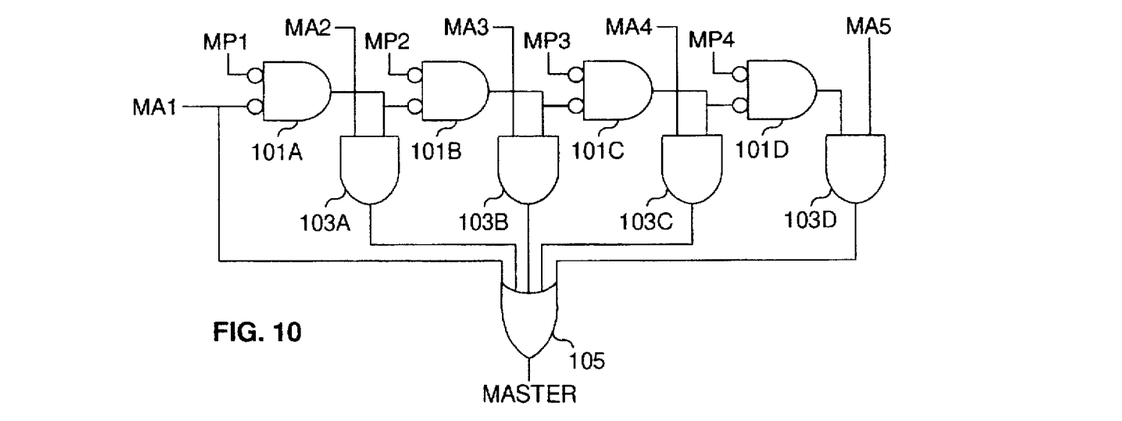
FIG. 10 is a logic diagram of the MASTER determination circuit.

The determination of the master module is made by the logic shown in FIG. 10. When module 1 (HUB1) is present, the MP1 signal from the inter-repeater bus 3 and the MA1 signal are logical 1. The MA1 signal of the module having the address 01111 (MA1) is coupled to an OR gate 105 to supply the MASTER signal signifying that the first module in the chain is the master module controlling the clock (CLK) and segment and join signals.

If the first module is not present, then the signals MA1 and MP1 are logical 0, enabling a NOR gate 101A (operating as a negative input AND gate) which primes an AND gate 103A. If the second module is present, then the MA2 signal is logical 1 enabling the AND gate 103A which in turn enables the OR gate 105.

If the first two modules are not present and the module address is MA3, then a NOR gate 101B is activated and an AND gate 103B activates the OR gate 105. An AND gate 103C is activated if the first three modules are not present and the module address is MA4 and an AND gate 103D is activated if the first four modules are not present and the module address is MA5.

The MA signals are each present only in the module assigned the address; they need not be supplied to other modules. Therefore, MA1 module will always be the master module when it is active. In the MA2 module, the only MA signal will be MA2, and the MA1 signal will be a logical 0. If MP1 is logical 0 (MA1 module not present), the MA2 module will be the master module because the NOR gate 101A output and the MA2 signals will be logical is, enabling the AND gate 103A. Successive modules will be the master module if the preceding modules are not present in an analogous way.

When the described hardware is used for address sensing and master module selection, perturbations in the signals from the address pins as a module is being removed or added will create fluctuations that will, in effect, disable the active modules until the signals stabilize. This problem can be avoided by using wait states when an address change is detected. The following pseudo-code describes a refinement that can be implemented in hardware or in software.

```
            Enter.
            Set COUNT to 0.
READ>       Read address signals to ADDR.
            Set REPEAT to 0.
            Set MOD_ADR to 1.
            If ADDR is odd: go to ODD.
SHIFT>      Shift ADDR right 1 bit.
            Increment REPEAT.
            If ADDR is even: increment MOD_ADR.
            If ADDR is odd: go to ODD.
            If MOD_ADR = 5: exit.
            If ONE flag is not set: go to SHIFT.
            If ONE flag is set: go to CNT_CHK.
ODD>        Set ONE flag.
            If REPEAT < 4: go to SHIFT.
            If REPEAT = 4: exit.
CNT_CHK>    Increment COUNT.
            If COUNT < 6: wait 10 seconds; go to READ.
            If COUNT = 6: set ERROR flag; exit.
```

The above pseudo-code procedure or subroutine can be executed at predetermined time intervals or when the ADRCHGINT signal generates an interrupt. It will retry reading the address signals six times (or any other selected number) at ten second intervals (or can be any other time period). This allows at least a minute for the signals to stabilize before determination of the address. The procedure is based on the most significant address bit being read into the least significant bit of the variable ADDR.

The module address (MOD_ADD) is set to one (MA1) initially. If no cable is attached, the module may be the only hub in the stack and the pin values will be 11111. Therefore, if the first bit is one (ADDR is odd), the routine will check to insure that all the remaining bits are one. The module address will remain 1.

When the ADDR variable is shifted right by one bit position, the result will be even if the next address bit is zero and odd if it is one. So long as the ADDR variable bits are zero, the module address, MOD_ADR, will be incremented. Once the variable ADDR is odd, i.e., an address bit of one, the module address is no longer incremented and the remaining address bits are checked to insure they are ones. If a zero is encountered after a one is read, then the address is in error.

When six tries have failed to detect a valid address, an error flag is set and the procedure is exited. When the module address value is 5 as the result of reading five successive zero address bits, the procedure is exited.

While the invention has been particularly shown and described with reference to a preferred embodiment thereof, it will be understood by those skilled in the art that various changes and modifications in form and details may be made therein without departing from the spirit and scope of the invention according to the following claims.

Appendix

An example of a multiport repeater (MPR) is a commercially available device from Advanced Micro Devices, the Integrated Multiport Repeater Plus Am79C981. An MPR as described in this specification incorporates the IEEE 802.3 standards and complies with the Twisted Pair Transceiver functions of the 10BASE-T Standard.

The Am79C981 has eight Twisted Pair Medium Attachment Unit (MAU) and an Attachment Unit Interface (AUI). Multiple MPRs can be connected to increase the total number of ports per repeater unit. The Am79C981 accomplishes this via expansion ports.

An AUI permits connection to an Ethernet (10BASE5) and to Cheapernet (10BASE-2) coaxial networks and to fiber optic link (10BASE-F) segments.

An MPR such as the Am79C981 can interface directly with a manager device such as the Am79C987 (Hardware Implemented Management Information Base) from Advanced Micro Devices. When coupled together, such MPRs and HIM (Hardware Implemented Managers) are a complete repeater, and per port statistics, maintained in each repeater, can be accessed on demand using an eight-bit parallel interface. The HIM is interfaced to a microprocessor for asynchronous operations. The HIM internal registers can be read via a Command port or a Data port. The register address is written into the Command port and then the register's 32 bits are read as eight-bit bytes via a holding register.

The signals used by an MPR are summarized below. The signals are labelled as input, output, or tristate bidirectional. The latter exhibit a high impedance when inactive so the line to which they are connected can be controlled by other tristate drivers. They can transmit signals in either direction when active. A bar ($\bar{\phantom{x}}$) signifies the active or logically true asserted state is low.

$\overline{ACK}$ (input)—Acknowledge—when low, it indicates to the requesting MPR device that it may control the DAT and JAM pins; if the MPR is not requesting control of the DAT line ($\overline{REQ}$ pin is high), then it indicates the presence of valid collision status on the JAM line or valid data on the DAT line.

$\overline{COL}$ (input)—Expansion Collision (input)—when low, it signifies that more than one MPR is active and that each MPR should generate the Collision Jam Sequence independently.

CI+,CI- (input)—Control In—AUI port differential receiver for signals that comply with IEEE Std. 802.3, Section 7.

CRS (output)—Carrier Sense—continuously supplies the states of the internal carrier sense signals for the AUI and eight twisted pair ports serially. It is synchronized to the $X_1$ clock (defined below).

DAT (tristate bidirectional)—Data—data signals generated as NRZ (non-return to zero) code when no collision condition exists; if collisions have occurred (the JAM signal is high), signals a multiport (DAT=0) or single port (DAT=1) condition. If $\overline{REQ}$ and $\overline{ACK}$ are both low, then DAT is an output signal. If $\overline{ACK}$ is low and $\overline{REQ}$ is high, then DAT is an input signal.

DI+,DI- (input—Data In—AUI port differential receiver.

DO+,DO- (output)—Data Out—AUI port differential driver.

JAM (tristate bidirectional)—Jam—when high, the signal on DAT indicates a multiport or single port collision condition. When $\overline{ACK}$ is high, the JAM output is a high impedance, i.e., not set to a signal condition. Otherwise, with $\overline{REQ}$ low, JAM is an output signal and with $\overline{REQ}$ high, JAM is an input signal.

$\overline{REQ}$ (output)—Request—when low, the MPR signal is requesting access to the DAT and JAM lines to transfer repeated data or collision status to other MPRs or that the MPR has one or more ports receiving or colliding or is transmitting data.

$\overline{RST}$ (input)—Reset—when low, resets the MPR logic and, if either expansion or port activity monitor is used, it should be synchronized with the $X_1$ clock.

RXD+$_{0-7}$,RXD-$_{0-7}$ (input)—Receive Data—twisted pair differential receive inputs at eight ports, i.e., port 0 through port 7.

SCLK (input)—Serial Clock—clocks data input or output during normal operation or otherwise is used together with the SI signal to control output information on SO.

SI (input)—Serial In—commands are clocked in by the SCLK signal during normal mode or otherwise used with SCLK to control output information on the SO.

SO (output)—Serial Out—management results are clocked out by the SCLK signal during normal operation and otherwise supplies serial output data on status information as follows determined by the states of SCLK and SI:

| SCLK Signal | SI Signal | SO Output |
|---|---|---|
| Low | Low | TP Ports Receive Polarity Status AUI Port test Error status |
| Low | High | Bit Rate Error (all ports) |
| High | Low | TP Ports Link Status AUI Port LoopBack Status |
| High | High | Port Partitioning Status (all ports) |

TP - twisted pair

STR (input/output)—Store—as output, this signal is high for two $X_1$ clock cycles after the nine carrier sense bits are supplied as output on the CRS line; as input, it is configured by the HIM after a reset and used to communicate commands.

TXD+$_{0-7}$,TXD-$_{0-7}$ (output)—Transmit Data—twisted pair port drivers for ports 0 through 7.

TXP+$_{0-7}$,TXP-$_{0-7}$ (output)—Transmit Predistortion twisted pair transit waveform pre-distortion control differential output from ports 0 through 7.

$X_1$ (input)—Crystal Input 1—crystal connection for internal clock generator or connection for externally supplied clock.

$X_2$ (input)—Crystal Input 2—crystal connection if crystal is used or is not connected if external clock is coupled to $X_1$.

The typical pin connections for an HIM such as the Am79C987 HIMIB) commercially available from Advanced Micro Devices are as follows.

CK (input)—Clock—master clock input which must be the same as the MPR $X_1$ signal.

$\overline{RST}$ (input)—Reset—resets the HIM logic and must be the same $\overline{RST}$ signal as the MPR.

SI (output)—Serial Input to the MPR SI line—sends commands to the MPR.

SO (input)—Serial Output from the MPR SO line—receives management port information from the MPR.

SCLK (output)—Serial Clock—couples to the same line on the MPR to supply a clock signal for serial transfers.

CRS (input)—Carrier Sense—coupled to the CRS line of the MPR to receive AUI and twisted pair port signals continuously.

STR (tristate output)—Store—connected to the STR line of the MPR.

$\overline{ACK}$ (input)—Acknowledge—indicates that data on the DAT and JAM inputs are valid.

$\overline{COL}$ (input)—Expansion Collision—indicates there is a transmit collision because more than one MPR is active at the same time and requesting access to the expansion port.

DAT (input)—Expansion Port Data—with $\overline{ACK}$ and JAM both low, the expansion port data is received NRZ data and with $\overline{ACK}$ high, the DAT state is ignored.

JAM (input)—Jam—when $\overline{ACK}$ is low and JAM is high, an active MPR is in a collision state with the state of DAT indicating either a multiport (DAT=0) or a single port (DAT=1) collision condition.

D7-0 (tristate bidirectional)—Data—data input or output.

C/$\overline{D}$ (input)—Command/Data—when high, selects the Command port and when low, selects the Data Port in the HIM.

$\overline{WR}$ (input)—Write Strobe—when low and HIM is selected ($\overline{CS}$ is low), a write operation is initiated.

$\overline{RD}$ (input)—Read Strobe—when low and HIM is selected, a read operation is selected.

$\overline{CS}$ (input)—Chip Select—when low, enables a read or a write to the eight-bit parallel port of the HIM.

RDY (output)—Ready—low at the start of every read or write cycle and is turned off (open drain) when HIM is ready to complete the operation.

$\overline{INT}$ (output, open drain)—Interrupt overline driven low when any unmasked interrupt occurs.

Additional details of the operation of an HIM such as the Am79C987 and an MPR such as the Am79C981 can be obtained from the data sheets available from Advanced Micro Devices. The functions of these devices are described in U.S. Pat. No. 5,265,123 or European patent EP-480-598-A.

Data Terminal Equipment (DTE) refers to devices or terminals attached to a communication network providing the interface between the user and the network. DTEs may include but are not limited to work stations, monitors, keyboards, and printers.

Collision as applied to a specified DTE is the simultaneous presence of its own send signal and a signal sent by another DTE.

A repeater is a device to which several DTEs or other repeaters are coupled—such as in a star network—that receives incoming signals and restores their integrity by reshaping or amplifying the signal or both. That is, the repeater receives data via many ports, extracts the signals' embedded clock information, and processes the data with its own clock. It then transmits newly timed, amplitude corrected, reshaped signals to all its ports. According to the IEEE Std. 802.3, a maximum of four repeaters can be connected serially which limits expansion.

A hub unit is a network building block that permits extensive expansion of networks. It is a connection point for network access units and performs collision detection. It has a specific number of input and output (I/O) ports and a single hub port can connect to another hub unit or to serve as a loop-back point.

Collision detection determines when two signals are interfering with one another, i.e., have collided. It inhibits transmission of the interfering signals and supplies a signal that a collision has occurred to stop transmission by every device in the network.

Point-to-point topology networks are those in which every DTE is directly coupled to every other DTE in the network. Such a configuration is limited to small networks because of high cost and complex supervision because of the lack of a central controller.

Star topology is a network configuration in which all DTEs in the network are coupled to a central controller which switches connections of any DTE to any other DTE in the network. It requires only a single connection to each DTE and is simple to control.

Ring topology denotes a network in which each DTE is coupled to two adjacent DTEs to form a ring of connected DTEs. A message token is passed from DTE to DTE in sequence around the ring that permits each DTE to send or to receive data from another DTE. It reduces the amount of interconnections needed but also has control difficulties due to lack of central control. Breakdown or malfunction of one DTE can cause the entire network to fail.

Bus topology networks are those in which the DTEs are each coupled to a single bidirectional bus. Each DTE is individually addressed and accesses the bus by some request arbitration strategy. Protocols are incorporated which prevent collisions.

Tree topology is represented by several bus topological networks coupled together over a common bus. It is useful for networks that cover long distances.

What is claimed is:

1. An address allocation apparatus for electrically coupling a first and second electronic device and assigning a unique address to said first and said second electronic device, comprising:

a first plug having a first plurality of pins connecting to said first electronic device;

a second plug having a second plurality of pins connecting to said second electronic device; and a cable coupler cross-coupling said first plurality of pins of said first plug to said second plurality of pins of said second plug, said first plug having a pin n of said first plurality of pins coupled to a pin n+1 of said second plurality of pins of said second plug through said cable coupler, said second plug having a front pin side and a rear pin side, said front pin side containing said second plurality of pins for connecting to said second device, said rear pin side detachably receives a first plug of a second address allocation apparatus, said second address allocation apparatus having at least one set of pins, said rear pin side for electrically coupling the second plurality of pins of said second plug to the at least one set of pins of said second address allocation apparatus.

2. The apparatus of claim 1, wherein said first electronic device and said second electronic device are operating in a computer network.

3. A method of determining the addresses of individual electronic devices electronically connected together by a cable, each electronic device having a unique physical location along the length of the cable, comprising the steps of:

generating address signals for said electronic devices by cross-coupling the electrical connections between said devices with a cable adapted to receive another cable piggy-back, said address signals uniquely corresponding to the unique physical location of each of said electronic devices in the system;

detecting said address signals within said electronic devices; and decoding said address signals within in said electronic devices.

4. The method of claim 3, further comprising the steps of:

generating a module present signal in each electronic device based on said address signal of the electronic device and an operating status of the electronic device, reading in each electronic device the module present signals generated by other electronic devices, comparing periodically the module present signals generated by other electronic devices to determine any change in number of electronic devices present.

5. A method for determining a change in number of devices on a network, comprising the steps of:

connecting each device to the network through a cable having a piggy-back interconnection plug;

assigning a unique physical address to each device interconnected in the network by cross-coupling the address signals in the cable;

generating a module present signal in each device corresponding to a unique address for said device;

transmitting the module present signal of each device onto the cable;

in each device reading all of said module present signals generated by each device; and comparing periodically all of said module present signals, thereby determining any changes in number of devices present.

6. An address allocation apparatus for electrically coupling a first and second electronic device and assigning a unique address to said first and said second electronic device, comprising:

a first plug having a first plurality of pins connecting to said first electronic device;

a second plug having a second plurality of pins connecting to said second electronic device; and a cable coupler cross-coupling said first plurality of pins of said first plug to said second plurality of pins of said second plug, said first plug having M total pins and N address pins, wherein M>N, a pin z of said N address pins of said first plurality of pins is coupled through said cable coupler to a pin z+1 of said N address pins for each N address pins of said second plurality of pins of said second plug, the Nth pin of said first plug is unconnected, and a first pin of said N address pins is coupled to an Mth pin within said first plug, said second plug having a front pin side and a rear pin side, said front pin side containing said second plurality of pins for connecting to said second device, said rear pin side detachably receives a first plug of a second address allocation apparatus, said second address allocation apparatus having at least one set of pins, said rear pin side for electrically coupling the second plurality of pins of said second plug to the at least one set of pins of said second address allocation apparatus.

* * * * *